(12) United States Patent
Reinecke (10) Patent No.: US 7,343,285 B1
(45) Date of Patent: Mar. 11, 2008

(54) METHOD TO INTEGRATE USER DATA INTO UNCOMPRESSED AUDIO DATA

(75) Inventor: Frank Reinecke, Baesweiler (DE)

(73) Assignee: Roxio, Inc., Santa Clara, CA (US)

( * ) Notice: Subject to any disclaimer, the term of this patent is extended or adjusted under 35 U.S.C. 154(b) by 872 days.

(21) Appl. No.: 10/409,954

(22) Filed: Apr. 8, 2003

(51) Int. Cl.
 *G10L 19/02* (2006.01)
(52) U.S. Cl. .................. 704/229; 700/500; 700/212
(58) Field of Classification Search ............ 704/229, 704/250, 253, 254, 500, 212
 See application file for complete search history.

(56) References Cited

U.S. PATENT DOCUMENTS

| | | | | |
|---|---|---|---|---|
| 5,225,904 A | * | 7/1993 | Golin et al. ........... | 375/240.12 |
| 5,455,814 A | * | 10/1995 | Sako ..................... | 369/59.25 |
| 6,363,209 B2 | * | 3/2002 | Sako et al. ............ | 386/94 |
| 6,675,148 B2 | * | 1/2004 | Hardwick .............. | 704/500 |
| 6,768,980 B1 | * | 7/2004 | Meyer et al. .......... | 704/500 |
| 2003/0012103 A1 | * | 1/2003 | Sako et al. ........... | 369/47.54 |

* cited by examiner

*Primary Examiner*—Richemond Dorvil
*Assistant Examiner*—Qi Han
(74) *Attorney, Agent, or Firm*—Martine Penilla & Gencarella, LLP (57) ABSTRACT

Methods for encoding user data into an audio file, and for decoding of the same, are provided. Embodiments include preparing user data for encoding into the audio file including writing user data in blocks of data including header and other information in addition to the user data. An audio file is read and parsed into words of audio data. In each word of audio data, a least significant bit is replaced with one bit of the prepared user data, and the audio data with the encoded user data is saved to a file. Methods of decoding the encoded audio file include extracting the user data from each least significant bit, verifying header information, and re-constructing the user data to a file.

13 Claims, 8 Drawing Sheets

METHOD TO INTEGRATE USER DATA INTO UNCOMPRESSED AUDIO DATA

BACKGROUND OF THE INVENTION

1. Field of the Invention

The present invention relates generally to the recording of audio data to a plurality of media, and more specifically to a method for encoding user data into audio data.

2. Description of the Related Art

A consumer's options for the appreciation of music have been greatly expanded with the development and growth of the computer industry, and with computer use in both the recording industry and in the home. Where once only the most skilled and sophisticated could produce and reproduce commercial quality recordings, a plurality of processes from creating one's own music, to internet download of commercially recorded and produced songs and albums, to creating custom mixes of desired music for both computer and audio component use is not only possible, but common practice for many an average consumer music enthusiast.

Multimedia is but one field of the growing expanse. Multimedia combines a plurality of media in a single presentation. By way of example, a text document might have an associated slide show that executes when a figure is selected, or a video might contain a separate audio narration sequence, or an audio recording might be supplemented with a music video, slide show, or visual commentary on the artist, the song, upcoming concert dates, and the like. While the combinations and resulting presentations are only as limited as the imagination of the person creating the file or presentation, there are still some technological barriers. One challenge is the combination of audio with other types of data in a single file.

As is known, uncompressed audio data is generally in a form and format distinct from that of other user data. While both audio files and data files might be written in a format that can be read from and written to the same optical media, for example, uncompressed audio (e.g., audio files in 44100 KHz, 16 Bit stereo uncompressed format) remains distinct from other forms of data. The challenge this presents is the combining of uncompressed audio with other data files of any type, and in particular, the combining of uncompressed audio with other data files on optical media.

In general, when audio data and other data files are recorded to the same optical media, the audio data and the other data files are recorded in independent, separate, tracks. Examples of such combining of audio and other data include a mixed mode compact disc (CD) which has one data track followed by up to ninety-eight audio tracks, and CD Extra which has up to ninety-eight audio tracks in a first session, followed by a data track in a separate session.

The recording of audio and other data files in independent, separate tracks and sessions does not present a problem for the average consumer in the simple recording of the tracks and sessions. Typically, the user selects the files to be burned to a destination optical media, and a media creating or recording application sequences the files and sets up the tracks and sessions on the destination media. The resulting media has audio tracks and a single data track, and thus both audio and data files are formatted and recorded to the same optical media. There is, however, generally no association between one or more audio files and one or more data files.

An exemplary multimedia presentation might include an audio song with accompanying CD text. Such CD text might include the name of the song, artist, recording date, producer, writer, lyrics, and other such information about the song, artist, and others involved in the recording and producing of the selection. Additionally, other data might be used to enhance the audio presentation. Other data files such as picture or image files, video clips, or an executable program might be desired to complement and enhance the audio data.

Typically, the audio data and the text or picture data is contained in separate files in separate tracks in the exemplary multimedia presentation. When transferring the presentation from one media to another, for example from one optical media to another optical media, or from an optical media to a hard drive, the user would need to know the source files of both audio and other data. Additionally, the audio data file would require some association with the text or other data. The average consumer might not be aware of the separate files, the locations of the files, and the necessary processes to transfer and associate the files. Although other file formats such as MP3 may encode text and pictures, there is currently no method or format of encoding additional data into uncompressed audio data with the capability of writing the encoded audio stream directly to compact disc (CD).

An additional drawback to separate but associated uncompressed audio and additional data files written to CD is that the data must be written disc-at-once. In mixed mode CDs, a data track must be written first, including any associations with audio tracks, followed by the audio track or tracks. Similarly, with CD Extra media, all audio tracks are written, followed by the single data track, again with any associations to the audio tracks.

What is needed is a method, system, and computer readable media to simplify the process to both transfer existing audio file and accompanying text, video, image, or other data files, and to create associated or combined audio and other data files.

SUMMARY OF THE INVENTION

Broadly speaking, the present invention fills these needs by providing methods for encoding user data into an audio data file or stream. The present invention can be implemented in numerous ways, including as a process, an apparatus, a system, a device, a method, or a computer readable media. Several embodiments of the present invention are described below.

In one embodiment, a method for encoding user data into an audio file is disclosed. The method includes preparing user data for encoding into the audio file. The method then provides for reading the audio file, and parsing audio data into words of audio data. A least significant bit of each word of audio data is replaced with one bit of the prepared user data, and the audio data with encoded user data is written to a file.

In another embodiment, a method for encoding data into uncompressed audio is disclosed. The method includes reading a source uncompressed audio file. Audio data is read from the source uncompressed audio in one block increments. The one block increments of audio data are parsed into words of audio data, and bits of data are inserted into words of audio data.

In still a further embodiment, computer readable media having program instructions for encoding additional data into uncompressed audio is disclosed. The computer readable media includes program instructions for preparing additional data for encoding into the audio file. Program instructions provide for reading source uncompressed audio, and for parsing audio data of the source uncompressed audio into words of audio data. Further, program instructions provide for replacing a least significant bit of each word of audio data with one bit of the prepared additional data, and for writing the audio data with encoded additional data to a file.

The advantages of the present invention are numerous. One notable benefit and advantage of the invention is the integration of additional data directly into an audio stream. When the resulting audio stream with integrated additional data is recorded to an optical media such as an audio CD, a resulting standard audio CD compatible with the Red Book audio standard is created. The audio CD is therefore playable on essentially any CD player, and the additional data is invisible to any usual or standard audio CD player.

Another benefit is the ability to burn integrated data files to CD media in track-at-once mode. In traditional mixed media or CD Extra media, audio and data files are in separate tracks. When writing separate audio and additional data files to a destination CD, it is necessary to burn in disc-at-once mode. Embodiments of the present invention provide for additional data integrated into an uncompressed audio file, and therefore recording to CD media can be accomplished in track-at-once mode, and can be written incrementally as well as in multiple sessions. Also, if it is desired to extract the integrated audio file from CD to, for example, a .wav file, edit the file, and then burn to another CD, only one track is accessed, the integrated information is retained, and the operation can be accomplished using essentially any CD recording software.

Yet another advantage to embodiments of the present invention is that audio playback along with action on or execution of the additional data is faster than typical separate file multi-media presentations. Because the additional data is integrated with the uncompressed audio data, seek time is minimized. Because the additional data is not written to a separate track, it is readily available for access or execution as appropriate without the added time and resources required for access and execution in prior art applications.

Other advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements.

DETAILED DESCRIPTION OF THE PREFERRED EMBODIMENTS

An invention for the creation and transfer of audio data that includes text, picture, or other data in the same file is disclosed. In preferred embodiments, a method for encoding text, image, or any other data, including additional audio data, if so desired, into an audio file includes replacing the Least Significant Bit (LSB) in each word of an audio stream with a bit of prepared, additional data. Further, the method provides for decoding the integrated additional data so that it may be read, played, executed, or otherwise operated upon in its original, native format.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

Figure 1A:
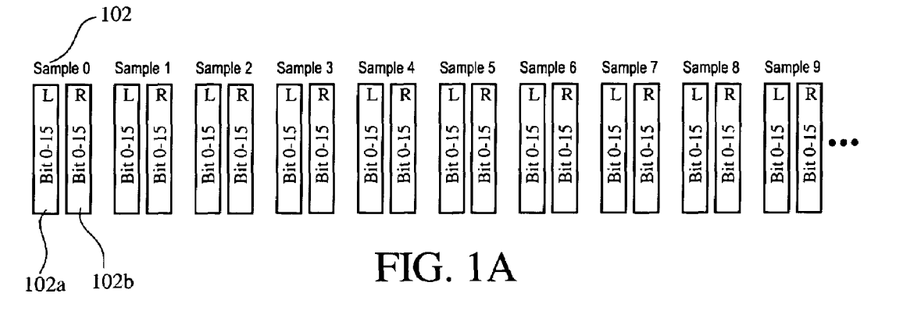
FIG. 1A shows a block diagram of exemplary uncompressed audio data.

FIG. 1A shows a block diagram of exemplary uncompressed audio data. In one embodiment of the present invention, the audio data is a 44100 KHz, 16-bit stereo, uncompressed audio stream. Audio data is commonly shown to include samples 102 of data. Each sample 102 includes a left word 102*a* and a right word 102*b* in stereo audio data, and each word 102*a*, 102*b*, includes 16 bits of data identified as bits 0 through 15. FIG. 1A illustrates in a block diagram a stream of audio data.

In one embodiment of the present invention, additional data is integrated into the audio data stream. Additional data includes essentially any data such as text files, image files, video files, executable programs, and even additional uncompressed audio data, or any other type of data as desired. As will be described in greater detail below, the additional data is parsed into bits of data, formatted, and then integrated into the audio stream. In one embodiment, the data is integrated or encoded into the audio data by replacing the least significant bit (LSB) in each word of audio data with a bit of the prepared additional data selected for integration.

Figure 1B:
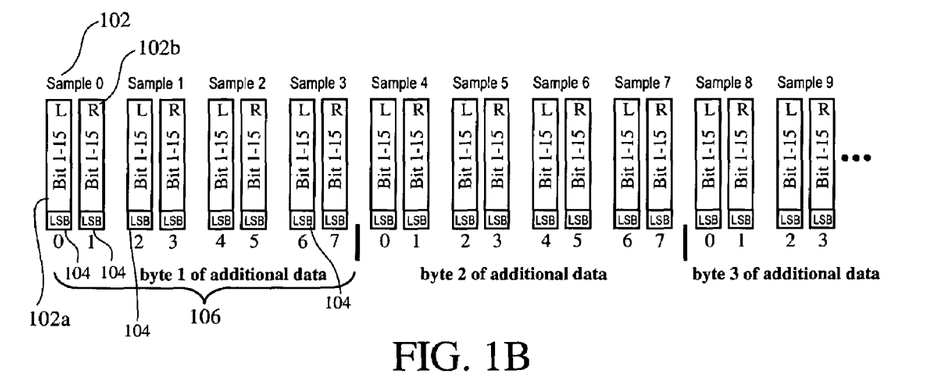
FIG. 1B illustrates the block diagram of exemplary uncompressed audio data as shown in FIG. 1A, with the LSB identified in accordance with one embodiment of the invention.

FIG. 1B illustrates the block diagram of exemplary uncompressed audio data as shown in FIG. 1A, with the LSB 104 identified in accordance with one embodiment of the invention. As can be seen in FIG. 1B, each 16-bit word 102*a*, 102*b* of uncompressed audio data dedicates one bit, the LSB 104, to one bit of additional data. Four samples 102 of audio data therefore contain 8 words 102*a*, 102*b* of audio data, in which 1 (one) byte or 8 bits of additional data is integrated. The first byte of additional data in FIG. 1B is shown at 106. It should be appreciated that the dedicating of the LSB 104 in each word 102*a*, 102*b*, to the additional data changes the audio processing from 16 bit (per channel) to 15 bit (per channel). The change in audio processing, however, is generally imperceptible to the average consumer ear.

As noted above, the additional data is parsed and formatted to be integrated or encoded, one bit at a time, into the audio stream. Once the additional data has been integrated into the audio stream, it is transmitted, played, and is in substantially all respects a part of the audio stream into which it has been integrated. It remains, however, additional data that is capable of being extracted, re-assembled, and read, played, viewed, or otherwise executed in its original form and format.

As is known, some forms or formats of audio data are generally read in blocks of 2352 bytes. In one embodiment of the present invention, additional data is integrated into audio data and, regardless of the type of data the additional data may be, is generally formatted or prepared to be integrated into audio data blocks of 2352 bytes. The formatted blocks of additional data are then parsed into bits which are integrated into the LSB 104 of each word 102*a*, 102*b* of an audio stream. When the bits of additional data are extracted from the audio stream, they are re-assembled into the formatted blocks as described below in reference to FIGS. 2A and 2B.

Figure 2A:
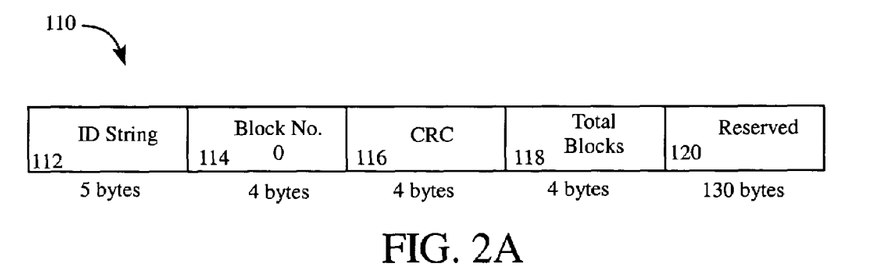
FIG. 2A shows block diagram of formatted additional data in accordance with one embodiment of the present invention.
Figure 2B:
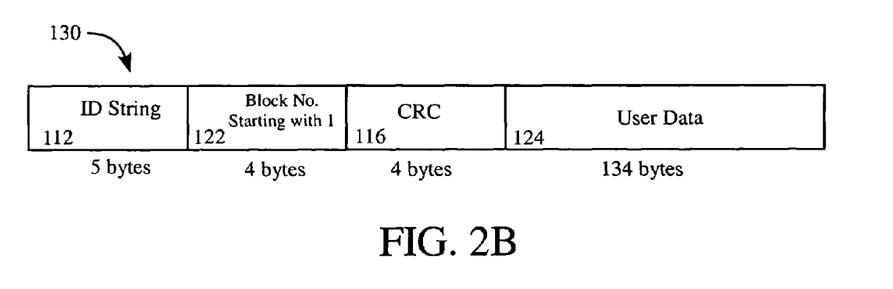
FIG. 2B illustrates a block diagram of an additional data block other than the first block shown in FIG. 2A, in accordance with one embodiment of the invention.

FIGS. 2A and 2B show block diagrams of formatted additional data in accordance with one embodiment of the present invention. In FIG. 2A, a first block 110, also known as a header block, for prepared additional data is shown. In one embodiment of the invention, a prepared, also referred to as a formatted block of additional data contains 147 bytes. The host audio data block contains 2352 bytes in 588 samples 102 (see FIGS. 1A and 1B). Each sample 102 contains two words 102*a*, 102*b*, and each word 102*a*, 102*b*, will host one bit of additional data in the LSB 104. Each block of audio data can therefore host 1176 bits or 147 bytes of additional data. In FIG. 2A, a first block 110 of additional data that will be integrated into a block of audio data is illustrated. In one embodiment, the first block 110 of additional data is distinct from all other blocks of additional data (e.g., FIG. 2B) in order to easily and quickly identify the beginning of a file of additional data that will be re-assembled into its original format.

In FIG. 2A, the first block 110 of additional data includes header information necessary to identify and validate a block of additional data. In one embodiment, the first block 110 begins with an ID String 112 in the first five bytes. The ID String 112 can be any desired identifying string of characters, digits, or alphanumeric combination to mark the beginning of a block of prepared additional data. Examples of ID Strings 112 include a manufacturer's name, a model name or number, or other such character strings as desired.

In one embodiment of the invention, the ID String 112 in the first block 110 of additional data is followed by a fixed Block No. 0, 114, identifier in the next four bytes. Block No. 0, 114, identifies the first block 110, the header block, of prepared additional data. Following Block No. 0, 114, the next four bytes are a simple checksum or validation code CRC 116. In accordance with known error correction and validation practices, the CRC 116 is included in the identified four bytes, and in one embodiment, is calculated using the Block Number 0, 114, and the Total Blocks 118 in the first block 110 of additional data. In other embodiments, the CRC 116 is calculated in the same manner, using the same data fields, as every other block of prepared additional data as described below in reference to FIG. 2B.

The next four bytes contain the Total Blocks 118 of the additional data. As will be described in greater detail below in reference to FIG. 3, the additional data is integrated into the audio stream over as many blocks of the audio stream as necessary to host the additional data, and then the additional data is repeated, beginning with block 0, such that additional data is written into the entire audio stream. In this manner, the additional data may be repeated a plurality of times in a single audio stream. In the event of read errors or invalid blocks, the repeated additional data can be used to replace missing or skipped blocks. The Total Blocks 118 of additional data is used to identify the number of blocks of additional data for re-assembly of the additional data into its original form, and to serve as a pointer to succeeding first blocks 110 of additional data.

Following the Total Blocks 118 is Reserved 120 space of 130 bytes. In one embodiment, the first block 110 of prepared additional data contains no user data. The first block 110 is formatted to define a block of additional data space to be integrated into a block of an audio stream, but contains only header information to identify the block as the first block 110, to provide the total number of blocks that contain the selected additional data, and contains no user data. In one embodiment of the invention, the Reserved 120 space of 130 bytes dedicates 4 bytes to indicate an original size in bytes of the additional data that is prepared and integrated into the audio stream. As described in greater detail below, the additional data is prepared and formatted, resulting in prepared data that is a multiple of 134 bytes. The original size of the additional data may or may not be an exact multiple of 134 bytes, and one embodiment identifies and indicates the original size of the additional data in 4 bytes of the Reserved 120 space.

FIG. 2B illustrates a block diagram of an additional data block 130 other than the first block 110 shown in FIG. 2A, in accordance with one embodiment of the invention. The additional data block 130 shown in FIG. 2B can be any of the data blocks 130 subsequent to the first block 110. The additional data block 130 begins with header information including an ID String 112 in the first five bytes. In one embodiment, the ID String 112 is the same ID String 112 contained in the first block 110 of additional data described above in reference to FIG. 2A. In one embodiment, the ID String 112 can be a string of characters, digits, or any desired alphanumeric combination. In the embodiment in which the ID String 112 is the same for all of the blocks of additional data integrated into a single audio stream, the ID String identifies related additional data that is to be re-assembled into a single additional data file. In an embodiment in which an original size of the additional file is indicated in the Reserved 120 space of first block 110, the number of additional data blocks 130 required to capture the additional data is easily calculable by dividing the original size in bytes of the additional data file by 134, rounding up to the next whole integer, and adding one to include the header or first block 110. Additional calculations are described in greater detail below in reference to FIG. 4.

Turning again to FIG. 2B, following the ID String 112, the next four bytes contain an identifying block number 122 starting with Block Number 1 and incrementing for each block of additional data until all of the additional data has been captured. In one embodiment, the total number of additional data blocks is essentially equal to the number written to block Total Blocks 118 (FIG. 2A). Because the first block 110, the header block, is block 0, the block number 122 for the last block of additional data 130 is one less than the number in Total Blocks 118 shown in FIG. 2A. Looking again to FIG. 2B, the next four bytes contain CRC 116 as described above in reference to FIG. 2A. In one embodiment, the CRC 116 for additional data blocks 130 is calculated using the block number 122 and the user data 124.

In one embodiment of the invention, the remaining one hundred thirty-four bytes of the additional data block 130 are User Data 124. User data 124 can be generally any type of data including text, image, video, executable program, and the like, or even additional audio data. A typical additional data block 130, other than a first block 110, contains one hundred thirty-four bytes of additional user data 124. As described above, the number of additional data blocks 130 is therefore determined by the size of the source file, and how many 134-byte increments will be required to capture all of the desired user data.

Figure 3:
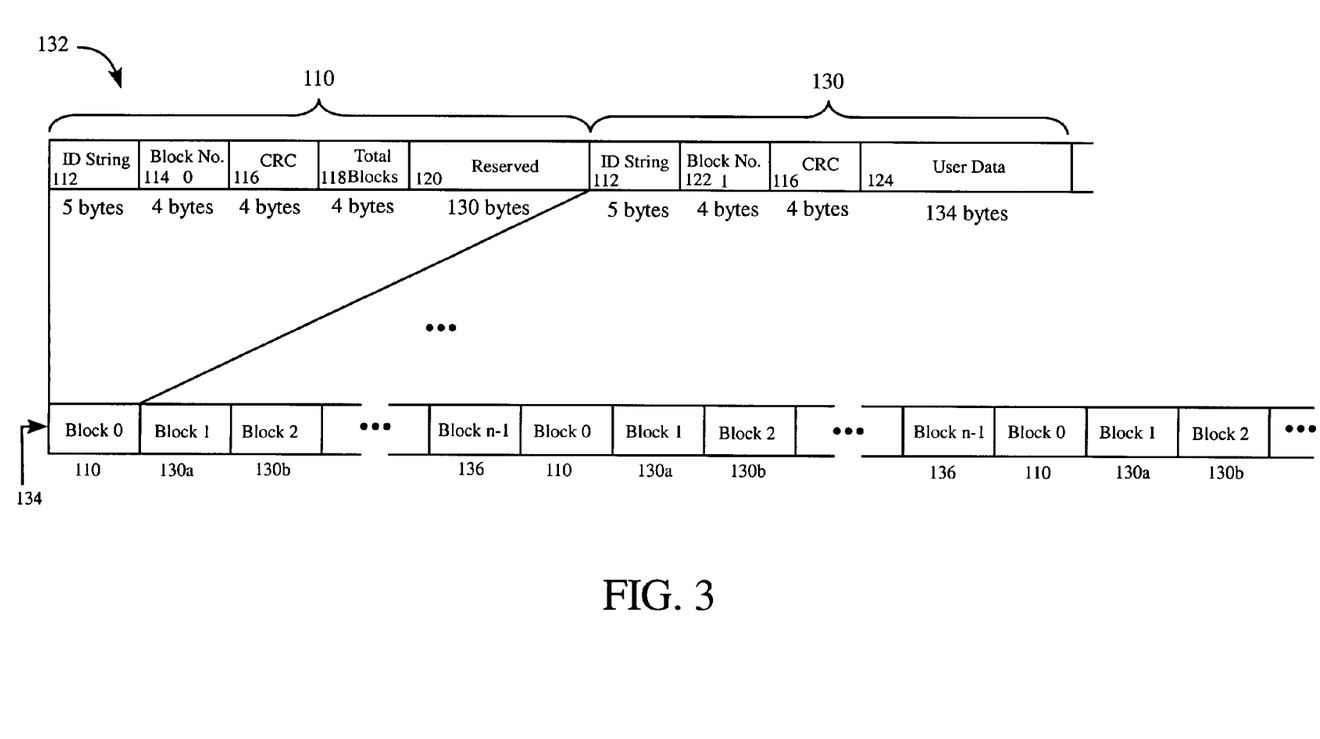
FIG. 3 shows an expanded block diagram of data blocks and their sequencing in accordance with one embodiment of the invention.

FIG. 3 shows an expanded block diagram of data blocks 132 and their sequencing 134 in accordance with one embodiment of the invention. Along the top row of FIG. 3, expanded data blocks 132 are illustrated with an exemplary expanded first block 110, followed by an exemplary expanded data block 130. As described above in reference to FIG. 2A, the exemplary expanded first block 110 includes a five-byte ID String 112, a four-byte Block No. 0, 114, a four-byte CRC 116, and a four-byte Total Blocks 118 as header information, followed by 130 bytes of Reserved 120 space. An exemplary expanded additional data block 130 follows the first block 110 and contains a 5-byte ID String, a 4-byte Block No., and a 4-byte CRC as header information. The additional data block 130 then contains 134 bytes of user data 124.

Along the bottom row 134 of FIG. 3, the sequencing of additional data blocks is illustrated. As used herein, sequencing refers to the order in which the prepared additional data blocks are integrated into the host audio stream. In one embodiment, as shown in FIG. 3, row 134 shows a first block 110 followed by data blocks 130*a*, 130*b*, and so forth. A final data block 136 is shown as Block n−1, signifying the end, or an end, of data blocks containing selected and prepared additional data. The block is designated as n−1, in one embodiment, on the assumption that the total blocks required for the selected prepared data is n, and since the first data block 110 is block 0, the last data block 136 is n−1.

In one embodiment of the invention, the additional data is integrated into successive blocks of audio data until all of the selected additional data has been written. If there is remaining audio data, the selected additional data is repeated, starting once again with a first block 110 and integrating successive additional data blocks 130. As is generally known, blocks of audio data that are determined to contain errors or are invalid are skipped. In one embodiment of the present invention, additional data is integrated into the audio stream. Therefore, if a block of audio is skipped or invalid, the additional data is skipped along with the audio data. If sufficient audio data permits, if the audio stream is of sufficient length, the repeating of the additional data increases the likelihood that all of the additional data will be captured. If, conversely, there is insufficient audio data for the selected additional data, the selected additional data will not be integrated or encoded. In FIG. 3, the multiple integration of the same additional data is illustrated by the sequence of block 0, 110, and block 1, 130*a*, through block n−1, 136. The next block is once again first block, block 0, 110, followed by data block 1, 130*a*, data block 2, 130*b*, and so forth through last data block n−1, 136, followed once again by first block, block 0, 110, and so forth.

As can be appreciated from FIGS. 1A-3, in order to integrate additional, other-than-audio, data into an uncompressed audio data stream, the selected additional data is first prepared, or formatted to be written into the LSB of each word of a 2352-byte block of uncompressed audio data. In one embodiment, the additional data is formatted into 147-byte blocks, with a first block including 17 bytes of header information and 130 bytes of reserved space, and additional data blocks including 13 bytes of header information and 134 bytes of user data. Once the additional data has been identified to be integrated into an audio stream, and then the additional data has been prepared, or formatted for integration, the additional data must next be integrated into the uncompressed audio data stream.

FIGS. 4-8 are flow chart diagrams illustrating various method operations for integrating additional data into uncompressed audio data in accordance with several embodiments of the present invention. The method operations illustrate functions including the preparing of the additional data, integrating the prepared data into the audio stream, decoding the integrated data, and verifying the retrieved data.

Figure 4:
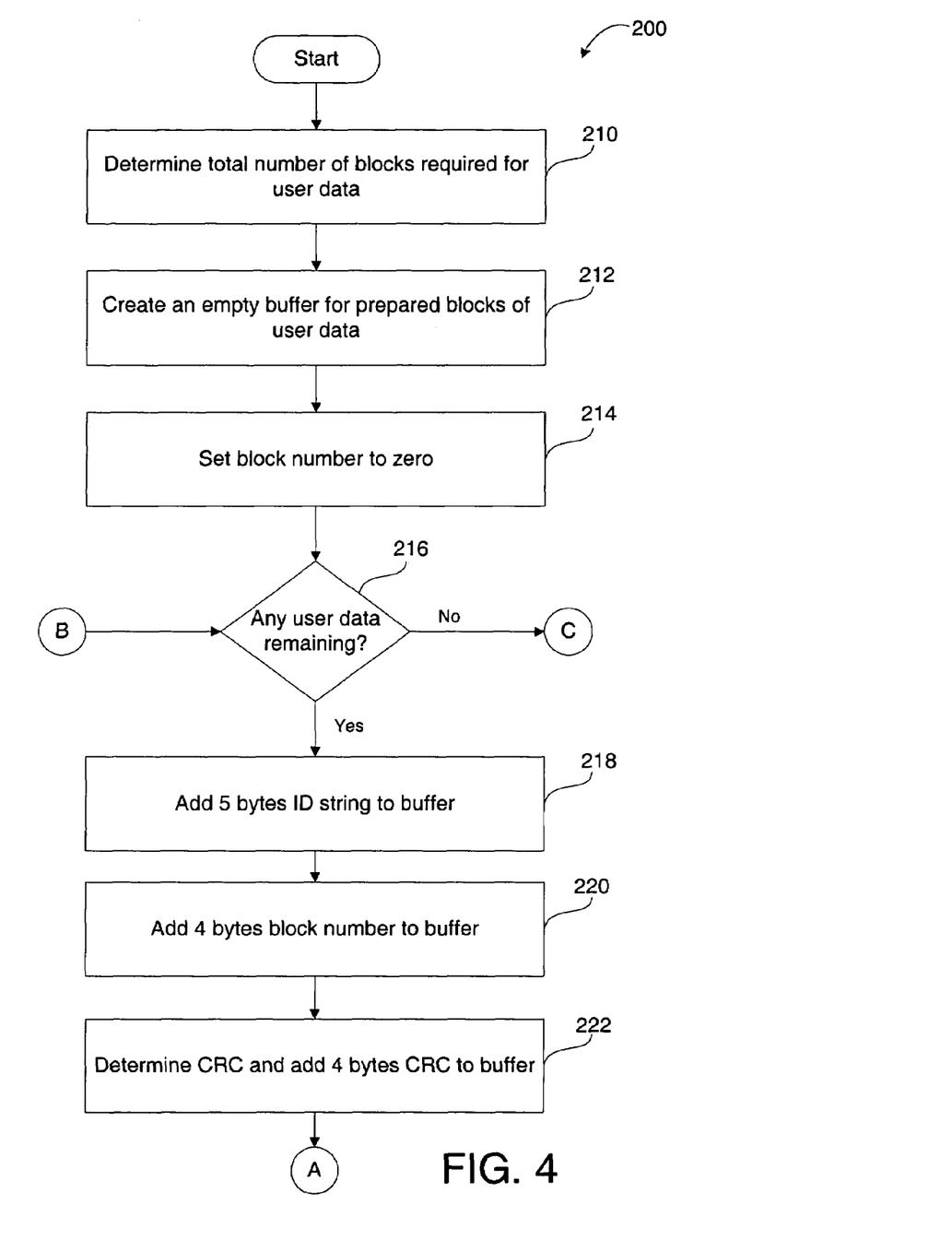
FIG. 4 shows a flow chart diagram illustrating the method operations performed in preparing additional data for integration into an uncompressed audio data stream in accordance with one embodiment of the present invention.

FIG. 4 shows a flow chart diagram 200 illustrating the method operations performed in preparing additional data for integration into an uncompressed audio data stream in accordance with one embodiment of the present invention. The method begins with operation 210 in which the total number of blocks required for additional user data is determined. As described above in reference to FIGS. 2A and 2B, 134 bytes of additional data, also referred to as user data, are integrated or encoded into each block of audio data. A first block of additional data, the header block, contains no user data. Therefore, in one embodiment of the invention, the number of blocks required for integrating n bytes of user data is equal to the total number of bytes of user data, plus an additional 133 bytes to account for or accommodate the header block. In one embodiment, a simple approximation for calculating the number of blocks required is: (n+133)/134. In another embodiment, a more precise formula is: (n+133)/134+1, rounded up to the next whole integer, since there are 134 bytes of user data in each block of audio data, and the header block contains no user data. As will be described in greater detail below, the last block of additional data may not have 134 bytes of user data. In this case, the remaining portion of user data is written into the user data area, and in one embodiment, the user data area is completed with zeros.

After the number of blocks required for user data has been determined in operation 210, the method advances to operation 212 in which an empty buffer is created to receive prepared blocks of additional data. In one embodiment, the size of the buffer is determined by the total number of blocks required as was just calculated in operation 210, multiplied by 147. As described above, the size of each block of prepared additional data is 147 bytes. The size of the buffer that will be required is then the total number of blocks multiplied by 147 bytes in each block.

The method next advances to operation 214 in which a block counter is initialized at block 0. In one embodiment of the invention, the method operations performed to prepare or format additional data for integration into an audio stream proceed through a repeating loop which results in formatting one block of additional data at a time until all of the additional data is formatted. Operation 214 sets a counter to zero so that the loop can repeat until the counter reaches the total number of blocks required for user data determined in operation 210. Additionally, when the counter is at zero, a first block is formatted as described below.

The method then proceeds with decision block 216 in which it is determined if any user data remains to be formatted. In one embodiment, the loop executes until the block counter reaches the total number of blocks required for user data determined in operation 210, plus 1. When the block counter reaches the total number of blocks required for user data determined in operation 210, plus 1, the answer to decision block 216 will be "no." In the initial pass through the flow chart 200, the answer will be yes, and the method will proceed to format a first block of additional data as described below. If the answer to decision block 216 is no, and no user data remains to be formatted, the method proceeds through connector "C" to operation 268 which is described in greater detail in the description of flow chart 250 in FIG. 5 below.

In an initial pass through flow chart 200, the answer to decision block 216 is yes since no user data has yet been formatted. In one embodiment of the invention, the method next proceeds to operation 218 and the formatting of a first block of additional data. In operation 218, five bytes of ID String are added to the created buffer. As described above in reference to FIG. 2A, the ID String can be any string of characters, digits, or alphanumeric combination as desired to identify the block of data. In one embodiment, the ID String contained in the headers of the first block of additional data, the data blocks, and the last block of additional data are all the same ID String. As will be described in greater detail below, in one embodiment of the invention, the ID String is the first field searched for when additional data is recovered in the decoding process. The ID String can therefore serve as a marker in the header of a block of data for easy locating and identifying of additional data to follow. In the initial pass through flow chart 200, the header information is completed for the first or header block of additional data. Subsequent passes through the illustrated method operations, so long as user data remains, the header information of data blocks containing user data is written as described above in reference to FIG. 2B.

The method next advances to operation 220 in which four bytes of Block Number are added to the buffer immediately following the five bytes of ID String. In the first data block, the four bytes of Block Number will identify the block as block 0 (zero), the header block as illustrated in FIG. 2A. Each subsequent pass through the illustrated method operations, so long as user data remains, the block number of each user data block is written as illustrated in FIG. 2B.

Next, the method proceeds with operation 222 in which the CRC is determined and written in the next 4 bytes added to the buffer. In one embodiment, the CRC is a simple checksum for validation of the additional data block to follow. In one embodiment of a first or header block of additional data, the CRC is based on the four bytes of Block No., and the 130 bytes of reserved space is not checked. In subsequent prepared user data blocks, the CRC is based on the four bytes of Block No. and on the 134 bytes of User Data. In another embodiment, the CRC is calculated in the same manner for all prepared data blocks, using the four bytes of Block No., and the 130 bytes of reserved space or 134 bytes of user data as applicable.

Following operation 222, the method proceeds through connector "A" to flow chart 250 in FIG. 5 as described below.

Figure 5:
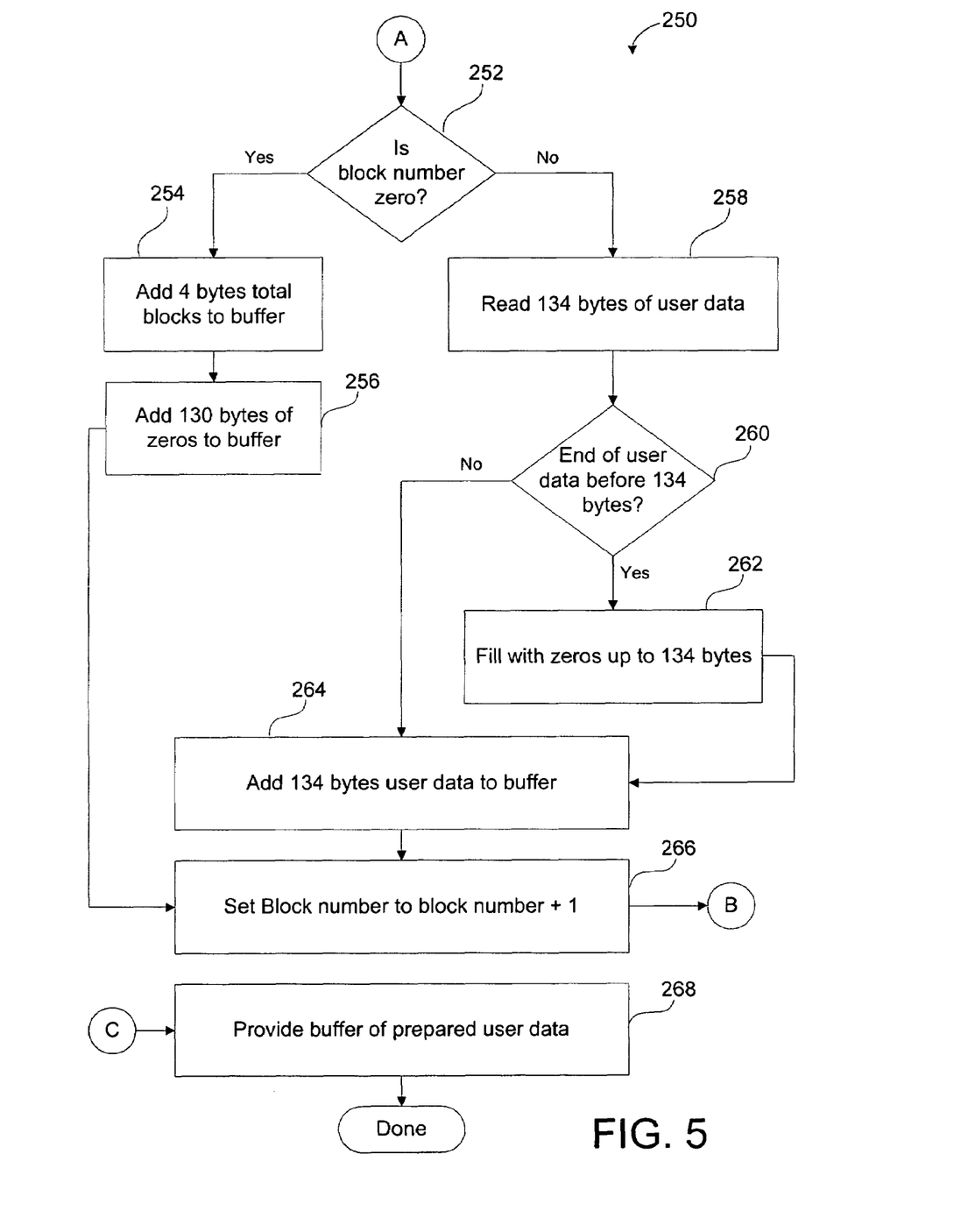
FIG. 5 shows flow chart illustrating the continuation of the method operations performed to prepare additional data for integration into an uncompressed audio data stream in accordance with one embodiment of the present invention.

FIG. 5 shows flow chart 250 illustrating the continuation of the method operations performed to prepare additional data for integration into an uncompressed audio data stream in accordance with one embodiment of the present invention. The method, proceeding through connector "A", continues with decision block 252 in which the method evaluates whether the Block Number is zero. If the Block Number is zero, a "yes" to decision block 252, the method proceeds to operation 254 and adding the four bytes of Total Blocks to the buffer. In one embodiment, Total Blocks was calculated in operation 210, and that result is written in Total Blocks of operation 254. In one embodiment, when the Block Number is zero and decision block 252 results in a "yes," the method proceeds to operation 254 and the formatting of a first block of additional data. As described above in reference to FIG. 2A, a first block of prepared additional data contains a Total Blocks field in the header, and contains no user data. After the method writes the four bytes of Total Blocks to the buffer in operation 254, the method advances to operation 256 in which, in one embodiment, 130 bytes of zeros are added to the buffer. The 130 bytes of zeros fill the reserved space described above in reference to FIG. 2A. In another embodiment, four bytes of the reserved space are used to write an original length in bytes of user data with 126 bytes of zeros as described above in reference to FIG. 2A.

Following the adding of 130 bytes of zeros to the buffer in operation 256, the method advances to operation 266 in which the Block Number is increased by one, and then proceeds through connector "B" to loop back to decision block 216. The loop through connector "B" is described in greater detail below.

If, in decision block 252, it is determined the Block Number is not zero, the method proceeds to operation 258 and the formatting of an additional data block. In operation 258, the method reads 134 bytes of user data. As described above in reference to FIG. 2B, each formatted block of additional data includes 134 bytes of user data, and 13 bytes of header information. The 134 bytes of user data read in operation 258 represents those user data bytes of a formatted additional data block.

Following operation 258, the method proceeds with decision block 260. In decision block 260, the method determines whether the end of the user data was reached before the allocated 134 bytes. If the end of the user data was reached, a "yes" to decision block 260, the method proceeds through operation 262 in which zeros are added to fill the 134 bytes. The method then advances to operation 264.

If, in reading the 134 bytes of user data in operation 258, the end of the user data was not reached before the limit of the allocated 134 bytes, a "no" to decision block 260, the method proceeds directly to operation 264. In operation 264 the method adds the 134 bytes of user data read in operation 258 to the buffer. The method next proceeds with operation 266 in which the Block Number is incremented by one, and the method loops back to decision block 216 through connector "B".

Returning to FIG. 4, the method proceeds through connector "B" to decision block 216 in which it is determined whether more user data remains. As long as some user data remains to be prepared or formatted, the method proceeds through the operations just described to format the header and user data sections of each block of additional user data. As each block of additional data is prepared, headers and then user data areas are added to the buffer created in operation 212. A block diagram of the resulting buffer would resemble the block diagram shown in FIG. 3.

At the end of the selected additional user data, decision block 216 will yield a result of no more user data remaining, a "no." The condition of no remaining user data can occur whether or not a "yes" was ever achieved in response to decision block 260. It is possible that the selected user data exactly fills the allocated space, and in such a circumstance a "yes" will never be a response to decision block 260. When the end of the user data is reached, however, a "no" response is reached in decision block 216, and the method proceeds through connector "C" to FIG. 5 and operation 268.

In one embodiment of the invention, when the method reaches operation 268, no user data remains. All of the blocks of additional data have been prepared and formatted, and written to the buffer that was created in operation 212. The last block of additional data may or may not contain zeros to fill the allocated 134 bytes of user data. The buffer contains the total number of blocks required for user data that was calculated in operation 210, and in operation 268 the buffer of formatted additional data, also referred to as prepared user data, is provided. Once the prepared user data is provided the method is done.

Figure 6A:
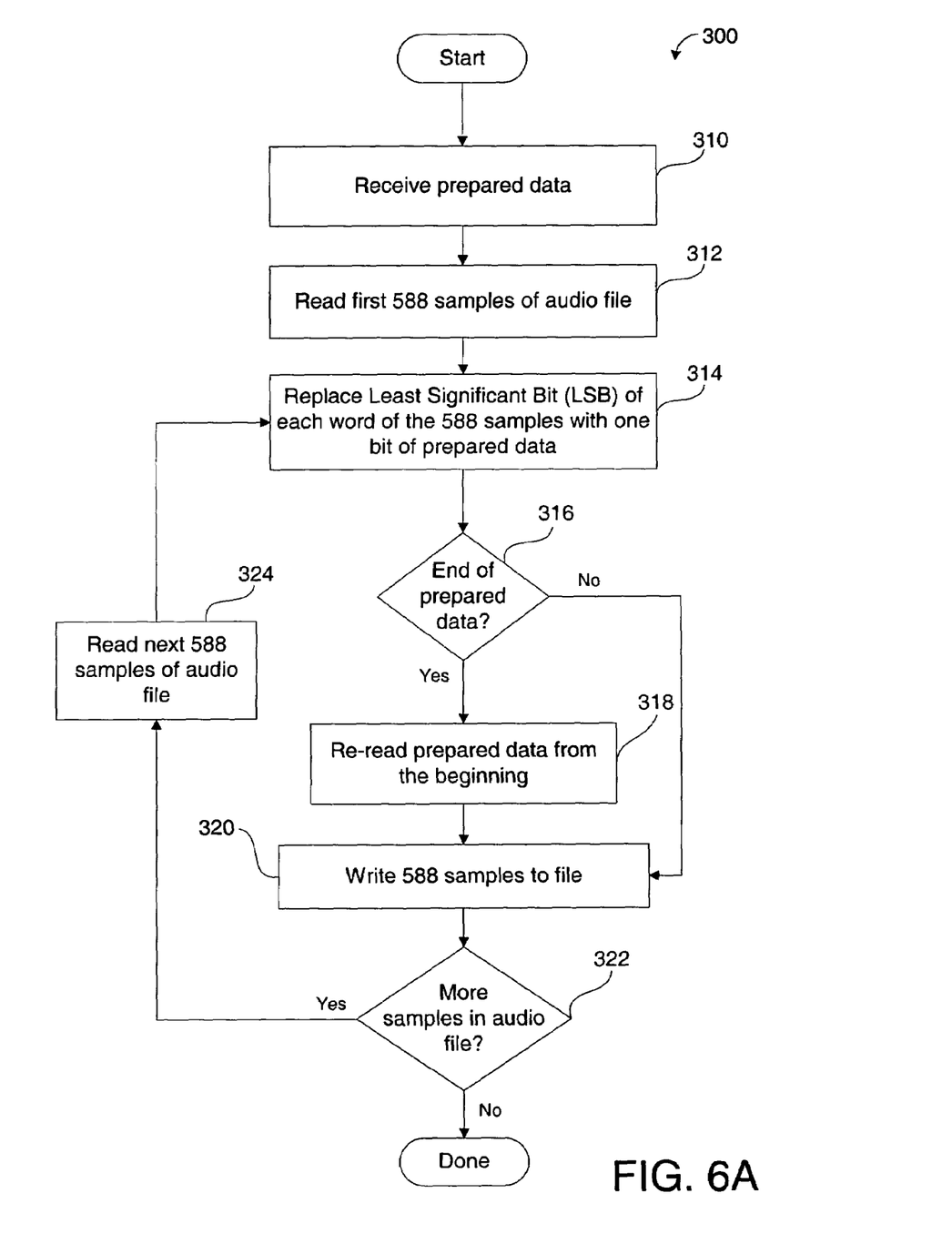
FIG. 6A is a flow chart diagram of the method operations performed to integrate additional data into an audio data stream or file in accordance with one embodiment of the present invention.

Once the selected additional data has been prepared, or formatted, for integration into an audio stream the prepared additional data is then integrated or encoded into the audio stream. FIG. 6A is a flow chart diagram 300 of the method operations performed to integrate additional data into an audio data stream or file in accordance with one embodiment of the present invention. The method begins with operation 310 in which the prepared data is received. The prepared data is as described in FIGS. 4 and 5. In one embodiment, prepared data is in a buffer and formatted with header information.

The method continues with operation 312 in which the first 588 samples of audio data are read. As described above in reference to FIGS. 1A and 1B, one form or format of audio data is typically read in samples with each sample containing a right and left word, and each word including sixteen bits of data. Generally, each pair of right and left words of each sample represents a right and left channel in stereo audio data. Each sample, then, contains 32 bits of data. 588 samples equals 18,816 bits, or 2352 bytes. The 588 samples have two words each, for a total of 1176 words, each with a Least Significant Bit (LSB) for a total of 1176 LSBs. As is known, common formats (on CD, typically the Red Book standard) for audio data are typically read in blocks, and one block of audio data includes 2352 bytes. The 588 samples of audio data read in operation 312 correspond to one block of audio data.

Following operation 312, the method proceeds with operation 314 in which the LSB of each of the 1176 words in the 588 samples of audio data is replaced with one bit of the prepared additional data. In one embodiment, the prepared additional data is read from the buffer one block at a time, and parsed to replace each LSB in each word of the audio data with one bit of the prepared additional data. In another embodiment, the prepared additional data is read from the buffer one bit at a time, the one bit being read into the LSB of each word of each of the 1176 words of the 588 samples of audio data. In operation 314, the prepared data is sequentially integrated into the LSB of each word of the sample of audio data. With 1176 words, each with a LSB, a total of 147 bytes of additional data can be written to each block.

Figure 6B:
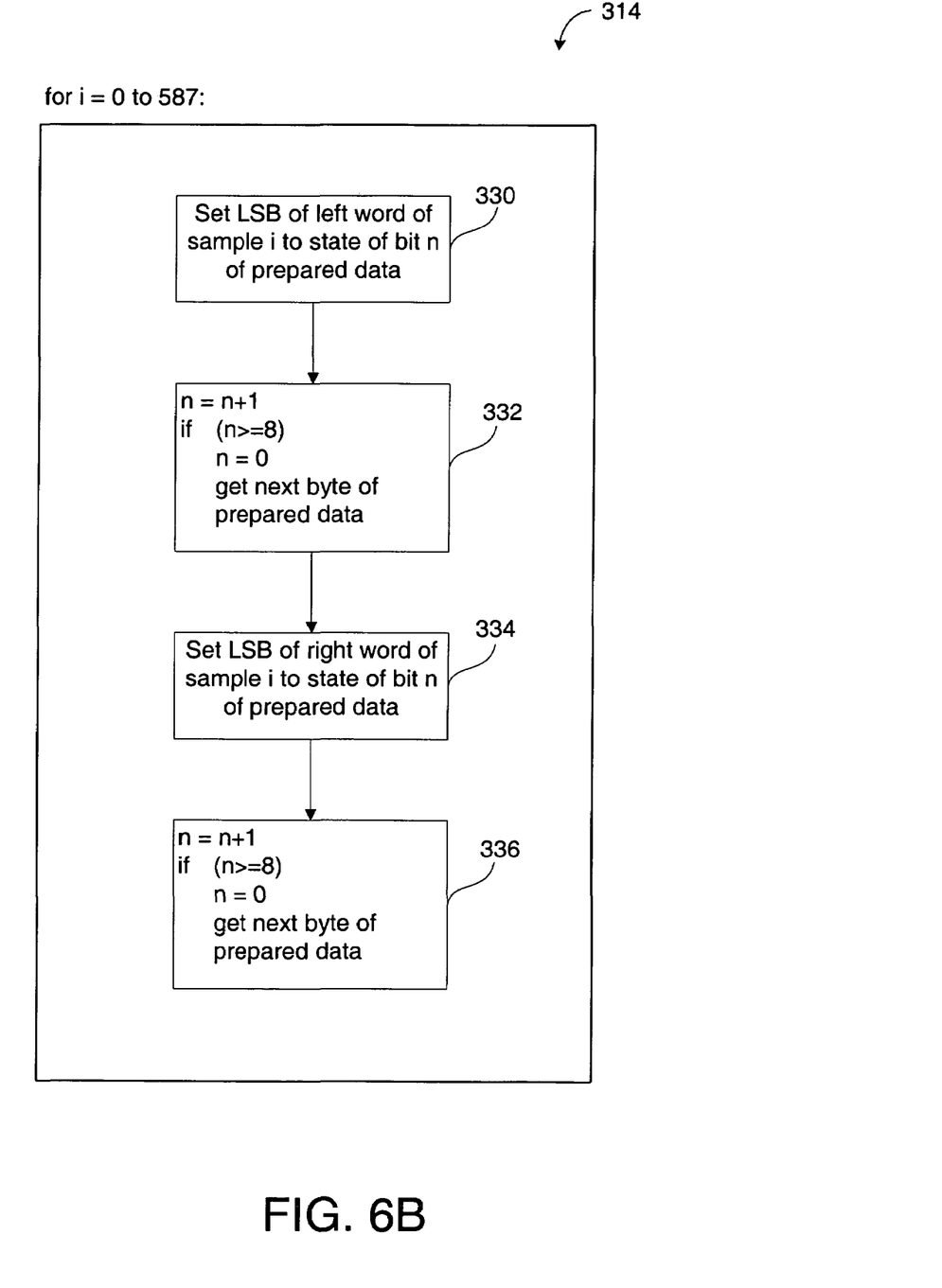
FIG. 6B shows a more detailed process for operation 314 of FIG. 6A in accordance with one embodiment of the invention.

In one embodiment, operation 314 includes the replacing of the least significant bit of each word of a two-word sample of the 588 samples read in operation 312. The least significant bit is replaced by one bit of the prepared data which is in a buffer as described above in reference to operation 310. FIG. 6B shows a more detailed process for operation 314 of FIG. 6A in accordance with one embodiment of the invention. As shown in FIG. 6B, operation 314 includes the replacement of the least significant bit of each of the left word and the right word of each sample of the 588 samples read in operation 312 (or 324) of flow chart 300. For each block of 588 samples, counter "i" represents sample 0 through sample 587. In each sample, the least significant bit of the left word of is set to the state of bit n of the prepared data in operation 330, with n representing a counter of bits of data and the initial value of n for each block is 0. In FIG. 6B, "n" represents a single bit of the prepared data, and the prepared data is typically read in bytes of data. Each byte of data includes eight bits, n, or bits 0 through 7. Therefore, after setting the least significant bit of the left word in operation 330, n is increased by one to point to the next bit n in a byte of prepared data. Once n is greater than or equal to 8, the number of bits in a byte, n is reset to 0 in order to read the first bit n of the next byte of prepared data.

The process described above is repeated for the right word of a sample i, with the least significant bit of the right word of sample i set to the state of bit n of prepared data in operation 334, and then n increased by one until n is greater than or equal to 8 shown in operation 336, thereby reading each byte of prepared data, one bit n at a time.

Returning to FIG. 6A, the method advances to decision block 316 following operation 314. In decision block 316, it is determined whether the end of the prepared data has been reached. The determination of whether the end of the prepared data is reached is, in one embodiment, an on-going process during the replacement of the least significant bit described above. In another embodiment, it is not necessary to check whether the end of data is reached during the replacement of the least significant bit, as the length of the prepared data is a multiple of the block length, and therefore the end of data need not be verified until a next block is obtained. As described above in reference to FIGS. 2A-3, if the audio stream or audio data file is longer than the total number of blocks of prepared additional data, the prepared additional data is repeated until no more audio data remains. Since audio data with errors or indicating as invalid is typically ignored when read, the integrated additional data is ignored with the ignored audio data. In one embodiment, the repeating of the prepared additional data increases the likelihood that all of the additional data will be retrieved and available for its intended use. Decision block 316 represents a check to see if the end of the prepared data has been reached in the buffer. If it has, a "yes" to decision block 316, the method proceeds to operation 318 to re-read the prepared additional data from the beginning of the data in the buffer. In one embodiment, the re-reading of the prepared additional data is a re-setting of a pointer to the beginning of the prepared data in the buffer. Once the pointer has been re-set, the replacement of the least significant bit of each word of the 588 samples with one bit of prepared data (see operation 314) continues, re-reading the prepared data from the beginning of the buffer to which it was written. A "no" to decision block 316 indicates each word of each sample of the 588 samples has the least significant bit replaced with a bit of prepared data, and more prepared data remains to be encoded into the remaining audio stream.

Once the least significant bit of each word of the 588 samples has been replaced with a bit of prepared data (operation 314), and the pointer has been reset to the beginning of the prepared data as necessary, the method proceeds with operation 320 in which the 588 samples are written to a file. In one embodiment, the file to which the 588 samples are written serves as a temporary storage structure into which the encoded audio stream is written, one block at a time, as each block is encoded with the prepared data as described above. In one embodiment of the invention, as each block of audio data that has additional data integrated, is completed, it is written to a file. In another embodiment the audio data having integrated additional data is written or directly to a CD track. When written to a file, the file can be cumulative so that, as blocks are completed, they are written immediately following a preceding block. The file can be located anywhere accessible to the computer system as desired such as a hard drive, a floppy disc, optical media, a network drive, peripheral device, and the like. Once all of the audio data, or a complete audio file or track, has been integrated with additional data, the accumulated file is a completed audio file or track that includes integrated additional data. In another embodiment, as each block of integrated data is completed, it is written to a buffer. Once the entire audio file or track has been integrated with additional data, the accumulated contents of the buffer are written to a file, and in another embodiment, written directly to CD in track-at-once mode. In other embodiments, the 588 samples of the one block of audio data is saved or written to a temporary storage file, folder, or other structure configured to receive the encoded audio stream one block at a time, accumulating each block of encoded audio stream until the entire encoded stream is received and assimilated.

The method then continues with decision block 322. In decision block 322, it is determined whether more samples of the audio data or audio stream remain. If more samples of audio data remain to be integrated or encoded with additional data, a "yes" to decision block 322, the method proceeds to operation 324 in which the next 588 samples, or one block, of audio data are read, and then loops back to operation 314 and the replacing of the LSB of each word of the 588 samples with the prepared additional data.

The method continues as described until no additional samples of audio data remain. When no audio data samples remain, a "no" to decision block 322, the method is done. In the illustrated embodiment, the integrated samples are written to a cumulative file, or directly to a CD track, in operation 320. Therefore, when no samples remain, the file or track contains a complete audio file, or audio stream, with integrated or encoded additional data. In an embodiment in which the integrated samples are written to a buffer as they are completed, an additional operation of writing the buffer to a file, or directly to a CD track, might occur following a "no" to decision block 322.

Figure 7:
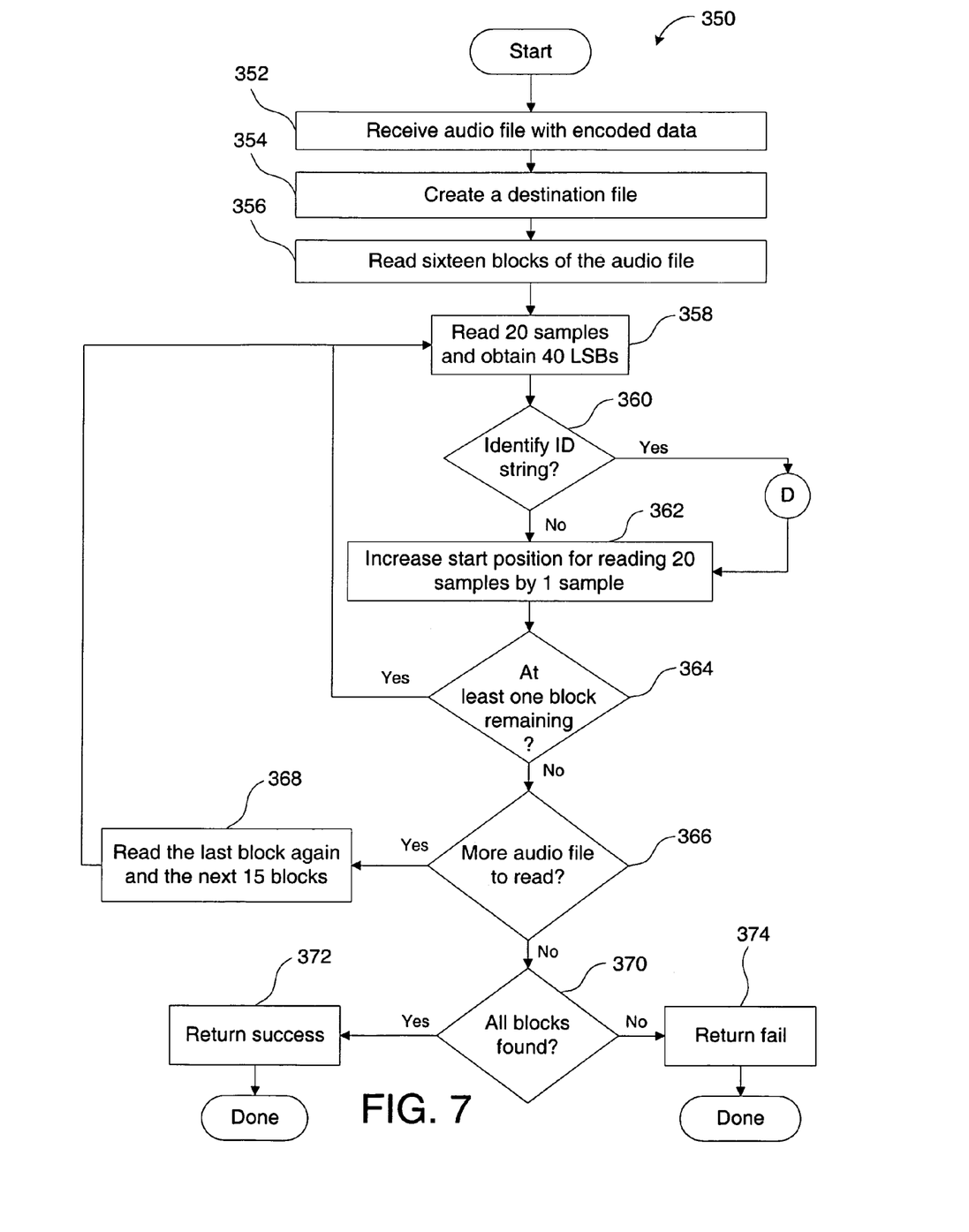
FIG. 7 shows a flow chart diagram illustrating the method operations performed in the initial decoding of additional data that has been integrated into an audio data file in accordance with one embodiment of the invention.

FIG. 7 shows a flow chart diagram 350 illustrating the method operations performed in the initial decoding of additional data that has been integrated or encoded into an audio data file in accordance with one embodiment of the invention. In one embodiment, an audio file with integrated, or encoded, additional data is first examined to verify the presence of the additional data, and that the additional data can be extracted and decoded.

In one embodiment, the examination and decoding is accomplished according to a specific algorithm configured to decode an audio stream with integrated or encoded data written according to specific standards and specifications for a particular form or format. By way of example, audio files with encoded data can be written and formatted to be recorded to CD optical media. As is known, files formatted for CD optical media in accordance with Red Book standards include blocks of data having 2352 bytes, and blocks in audio files have 588 samples, with each sample having 2 words and each word having 16 bits. In accordance with embodiments of the present invention, the least significant bit of each word is replaced with a bit of additional data. Embodiments of the present invention include an algorithm to decode an audio file with encoded or integrated additional data in accordance with the above parameters, and any number of algorithms can be constructed to accomplish decoding within the listed parameters, or within parameters for other forms or formats of data. Table 1 lists one algorithm in accordance with an embodiment of the present invention, and flow chart 350 describes the general method operations accomplished in the execution of the algorithm of Table 1.

TABLE 1

Read audio file containing encoded other-than-audio data to end
  Read next x = 2352*16/4 samples
  for i = 0 to (2x − 2352/2 + 1)
    for j = 0 to 8*5          Find ID String
      Check LSB to determine whether it matches corresponding bit in
      ID string
    if not all 40 bits match
      continue loop with next i
    if DecodeOneBlock returns FAILED
                   (See Table 2)
      continue loop with next
    if all blocks found
      return SUCCESS
    i += 2352/2           block was decoded -- skip these bytes
    Put the not checked bytes back
    to read them again        2352/2 − 1 bytes
  if not all blocks found
    return FAILED Turning now to flow chart 350 in FIG. 7, the method begins with operation 352 in which an audio file or CD track is received which contains encoded or integrated additional data.

Next, in operation 354, a destination file is created or initialized. The destination file created or initialized, if a destination file should already exist, to provide a receptacle, space, or structure in which extracted additional data is accumulated and assimilated for use as intended.

The method proceeds with operation 356 in which sixteen blocks of the audio file are read. In alternative embodiments, the number of blocks of the integrated file are adjusted or varied according to system capacity, system processing speed, or operator desire. In the illustrated embodiment, integrated audio data is read in groups of sixteen blocks at a time. If less than sixteen blocks exist or remain in the audio file, one embodiment will read as many blocks as available to read.

The method next searches for the selected ID String associated with the integrated audio data. In operation 358, 20 samples are read. As described above in reference to FIGS. 2A and 2B, each block of prepared additional data includes header information that begins with an ID String. In one embodiment of the invention, the integrated audio file is initially examined to determine that it contains encoded or integrated other-than-audio data. In operation 358, the LSB of each of the words of audio data are examined starting with the first 40 bits of integrated data to locate and identify the ID String. In one embodiment, samples from each block are examined in groups of twenty. As described above in reference to FIGS. 2A and 2B, the ID String is five bytes in size. Each sample includes two words and two LSBs, and therefore twenty samples yield forty LSBs and forty bits of additional data, or five bytes.

The method continues with decision block 360 to determine whether an ID String is identified. If an ID String is identified, a "yes" to decision block 360, the method proceeds through connector "D" to operation 402 in flow chart 400 which is described in greater detail below in reference to FIG. 8. If the ID String is not identified, a "no" to decision block 360, the method continues to operation 362.

In operation 362, the start position for reading 20 samples is increased or shifted by one sample. If, by way of example, the first 20 samples were samples 0-19, in operation 362 the start position is shifted to sample 1. Assuming the method loops back to operation 358, the 20 samples read will be samples 1-20.

Before the method can loop back to operation 358 to read 20 samples from the shifted position obtained in operation 362, it must be determined that at least one block, 588 samples, remain to be read. If an ID String were identified with less than a block of encoded data, not all of the additional user data would be retrieved, and therefore in decision block 364 it is determined whether another block of audio data having integrated or encoded additional data exists. If so, a "yes" to decision block 364, the method loops to operation 358 to read 20 samples from the increased or shifted start position as described. Decision block 364 establishes a loop to read and examine each of the blocks that were read into memory in operation 356 described above, as well as operation 368 described below.

Decision block 366 establishes a loop to ensure the entire audio file or stream is examined. In one embodiment, if a block is decoded and verified to include an ID string, the block is so identified, and remaining blocks continue to be examined, returning to operation 362. Similarly, if the decoded block does not verify an ID string, remaining blocks will continue to be examined to identify the ID strings. In decision block 366, it is determined whether more audio file remains to be examined. If more audio file remains, a "yes" to decision block 366, the method proceeds through operation 368 in which the last block of the previously read 16 blocks and the next 15 blocks are read, if 15 blocks remain. The method then loops back to operation 358 and proceeds with the examination as already described.

If in decision block 366 it is determined that no more audio file remains, a "no" to decision block 366, then the method proceeds with decision block 370 where it is determined whether all blocks were found. As described above in reference to FIG. 2A, and is described in the method operations illustrated in FIG. 8, the header or first block of the prepared additional data includes a Total Blocks field of four bytes. The value of the Total Blocks field is compared to the number of decoded data blocks. If the values match and all blocks were found, a "yes" to decision block 370, the method returns success in operation 372 and the method is done. If all blocks were not found, a "no" to decision block 370, the method returns fail in operation 374, and the method is done.

Figure 8:
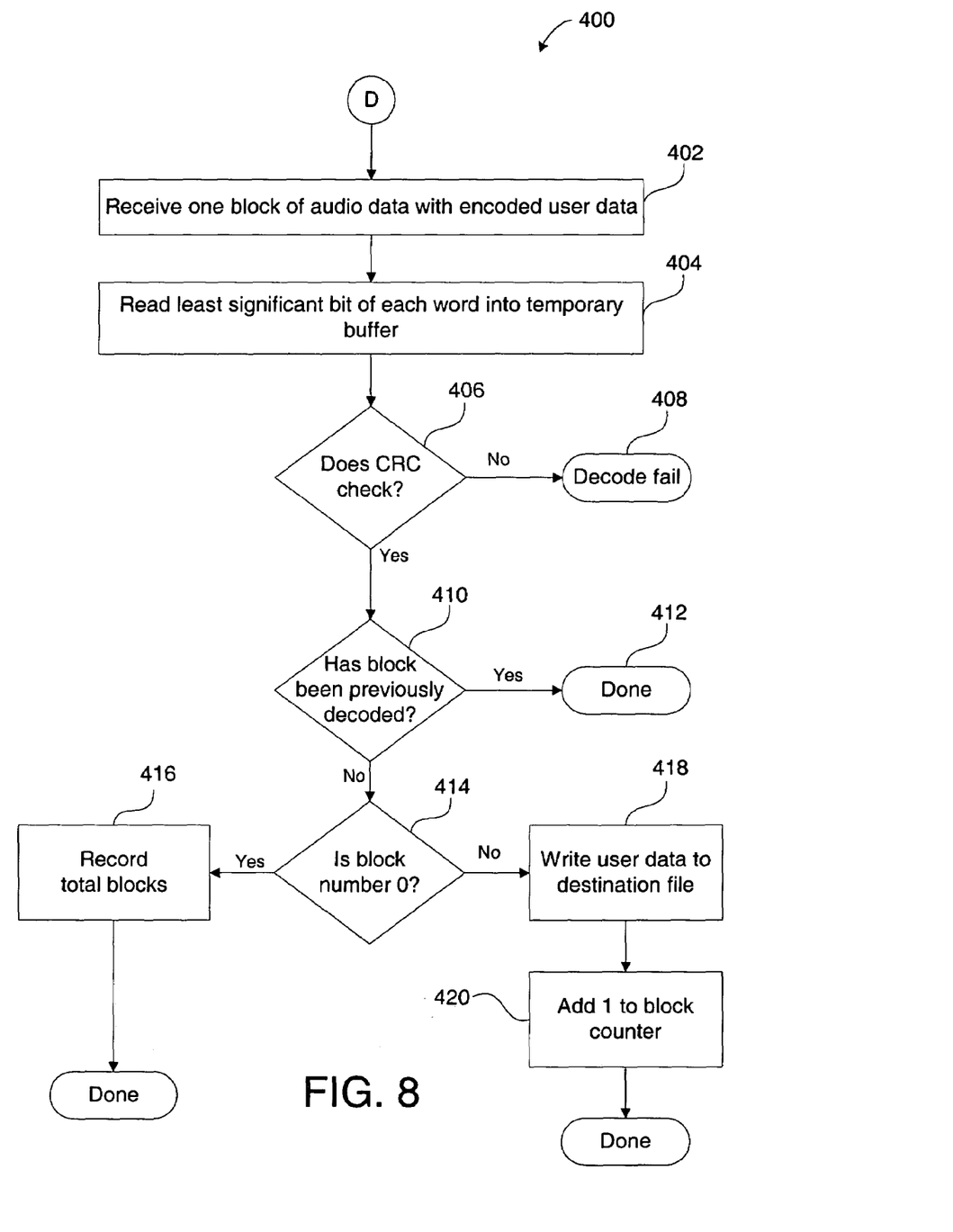
FIG. 8 shows a flow chart diagram illustrating the method operations performed to extract additional, other-than-audio data from an audio stream or file including integrated additional data in accordance with one embodiment of the present invention.

FIG. 8 shows a flow chart diagram 400 illustrating the method operations performed to extract additional data from an audio stream or file including integrated additional data in accordance with one embodiment of the present invention. As described above in reference to FIG. 7, embodiments of the present invention provide for the encoding and decoding of additional data from or into an audio data file or audio stream. Any number of algorithms can be constructed to accomplish the encoding and decoding in accordance with the desired form or format of the audio data. In one embodiment, audio data is formatted for CD optical media. Flow chart 400 of FIG. 8 illustrates the general method operations for extracting the additional data from an audio data file or stream. Table 2 lists one algorithm in accordance with the present invention to accomplish the method operations illustrated in FIG. 8.

TABLE 2 bu = new temporary buffer of 147 bytes
n = 0
for i = 0 to 147*8              Get the content of this block (all LSBs)
    Set bit n of byte i/8 of bu to state of LSB of the left word of sample i/2
    if i is even or set bit n of byte i/8 of bu to state of LSB of right word
    of sample i/2 if is odd
    n = n + 1                   Take next bit of temporary buffer
    if (n >= 8)
        n = 0                   Take next byte of temporary buffer
CRC = byte 5-8 of bu
BlockNumber = byte 9-12 of bu
if (NOT CheckCRC ( ))
    return FAILED
if (BlockNumber == 0)
    totalCount = byte 13-16 of bu
else
    write byte 13-146 of bu to position (BlockNumber − 1)*134 of the
    destination file
return Success Turning to FIG. 8, the method begins with operation 402 in which one block of audio data with encoded or integrated user data is received. In one embodiment, the audio data received is a single block containing 2352 bytes, in 588 samples, of audio data. In one embodiment, one block is processed through the illustrated method operations each time an ID string is successfully identified at decision block 360 of flow chart 350 illustrated in FIG. 7 and described in detail above.

Turning back to FIG. 8, the method continues with operation 404 in which an LSB of each word in the 588 samples of audio data with encoded or integrated additional data is read into a temporary buffer. As described above in reference to FIGS. 4, 5, 6A and 6B, in one embodiment, the additional data was prepared and then written to the LSB of each word of the audio data in one block increments. In one embodiment of the invention, the decoding or extracting of the additional data proceeds in one block increments as well. Each one block increment contains a predetermined header and defined amount of user data, and the extraction and re-assembly of the encoded, prepared data is configured to first extract the prepared data from the audio data, and then re-assemble the original additional data file by extracting the user data from the user data region of each block of extracted prepared data.

After reading each bit of prepared data from the LSB of each word in the first block of audio data into the temporary buffer in operation 404, the method continues with decision block 406 and a data verification routine. In decision block 406, the method determines whether the CRC checks. As is known, CRC is a checksum verification. In one embodiment of the invention, CRC is utilized to verify the data, and if the CRC checks in decision block 420, a "yes" result, the method continues with succeeding method operations. If the CRC fails, a "no" to decision block 420, the method terminates at 408 with a failed decode operation. In one embodiment, a "failed" result is returned to the previous method described in reference to FIG. 7.

If the CRC checks in decision block 406, the method advances to decision block 410 where it is determined whether the block has been previously decoded. In one embodiment, a block number for each block of prepared data is included in the header for each block (see FIGS. 2A-2B). If the block number identifies a block that has been previously decoded, a "yes" to decision block 410, then the method terminates at 412, and returns to operation 362 in FIG. 7 to continue searching for valid blocks of additional data. Otherwise, a "no" to decision block 410, the method continues to decision block 414.

In decision block 414, it is determined if the block number is 0 (zero). As described above in reference to FIGS. 2A and 2B, the 6th through the 9th byte (bytes 5-8) of a block of prepared data contain the Block No. In a first or header block of additional data, the bytes are fixed at Block No. 0 (zero). In additional prepared data blocks other than the first or header block, the Block No. increments from a Block No. 1 to a Block No. n–1 in accordance with a total number of blocks required for the additional data. In decision block 414, the method determines whether the prepared data read into the temporary buffer in operation 404 is Block No. 0 (zero). If the block number is zero, a "yes" to decision block 414, there is no user data in the block of prepared data in the buffer. The method therefore proceeds to operation 416 in which the Total Blocks is recorded. As described above in reference to FIG. 2A, the 14th through the 17th byte (bytes 13-16) of the first additional data block contains the Total Blocks of prepared data. If the method determines the extracted data is block number zero, it is a first or header block and contains the total number of blocks of prepared additional or user data. In operation 416 the total number of blocks is retrieved from the Total Blocks field and recorded. In one embodiment of the invention, the total number of blocks is used to verify that all of the additional data is extracted and re-assembled, and it serves as a pointer to the location in the audio stream when the additional data repeats so that redundant data is not unnecessarily extracted and re-assembled.

After the total number of blocks is recorded in operation 416, the method is done. In one embodiment, the extraction and decoding process returns to operation 362 in FIG. 7 to continue reading and examining the audio stream as described. The total number of blocks is recorded and will be used to verify whether all additional data has been successfully decoded.

If the additional data block is not a first or header block, a "no" to decision block 414, the method proceeds to operation 418 in which the user data is extracted and written to a destination file. In one embodiment, the destination file was created in operation 354 illustrated and described in FIG. 7. As described above in reference to FIG. 2B, user data is written to the last 134 bytes of a block of prepared additional data. In one embodiment, the user data is extracted from the block of prepared data and written to the destination file created in operation 354 (see FIG. 7). The file, in one embodiment, is configured to be a cumulative receptacle for data so that each successive 134 bytes of user data are written immediately following the preceding 134 bytes of user data, which ultimately re-assembles the original additional data file. In one embodiment, the space in the destination file is allocated in 134-byte increments. By way of example, block n of user data is written to position (n−1)×134, so that the first block is written to the 0 position having bytes 0-133, the second block written to the 1 position having bytes 134-267, and so forth.

After writing the user data to the destination file in operation 418, the method continues with operation 420 in which a block counter is incremented by one. In one embodiment of the invention, the method has recorded the total number of blocks of user data that were encoded or integrated into the audio stream, and during the extracting and decoding, the method tallies the number of blocks to verify that all of the blocks of data were received, extracted, and re-assembled into a copy of the original additional data. After the block counter is incremented in operation 420, the method is done. In one embodiment, the process returns to operation 362 in FIG. 7 to continue reading and examining audio data as described.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, DVD-ROM, DVD-R/RW, DVD-RAM, DVD+R/+RW, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for encoding user data into an uncompressed audio file to be recorded to a compact disc (CD) in track-at-once mode, comprising:

formatting the user data for encoding into the uncompressed audio file, wherein the formatted user data have a header block and a plurality of data blocks, the header block and each of the plurality of data blocks having an ID string identifying related user data, the header block having total blocks used to identify the number of blocks of formatted user data, the ID string and the total blocks being used for re-assembling the formatted user data into a single user data file before being formatted for encoding;

reading the uncompressed audio file;
parsing audio data of the uncompressed audio file into words of the audio data, wherein each word contains 16 bits;
replacing a least significant bit (LSB) of each word of the audio data with one bit of the formatted user data to encode the audio data, wherein replacing the LSB of each word changes processing of the uncompressed audio file from 16 bits per channel to 15 bits per channel, and wherein the bits of formatted user data in the encoded audio data are to be re-assembled in a form of the user data before being formatted to be encoded into the audio data; and
writing the encoded audio data to the CD in track-at-once mode.

2. The method of claim 1, wherein the uncompressed audio file is in 44100 KHz, 16-bit stereo uncompressed audio format.

3. The method of claim 1, wherein preparing the user data comprises:
determining a number of bytes required for encoding the user data;
creating a buffer for the number of bytes required for encoding the user data;
writing header information into the buffer; and
writing bytes of the user data into the buffer,
wherein the writing of bytes of the user data into the buffer is in blocks of formatted user data, the blocks of formatted user data including the header block and at least one subsequent block of one of the plurality of data blocks, the at least one subsequent block including header information and at least part of the user data.

4. The method of claim 3, wherein the at least one subsequent block of formatted user data includes 134 bytes of user data.

5. The method of claim 1, wherein the user data includes one of text data, image data, program data, and audio data.

6. The method of claim 3, wherein each block of the formatted user data includes 588 samples, and each sample includes 2 words.

7. A method for encoding additional data into an uncompressed audio file to be recorded to a compact disc (CD) in track-at-once mode, comprising:
formatting the additional data for encoding into the uncompressed audio file, wherein the additional data are formatted to allow re-assembling the formatted additional data into a single additional data file before being formatted for encoding;
reading the uncompressed audio file, wherein audio data of the uncompressed audio file are an uncompressed audio stream with words, each word having 16 bits;
reading the formatted additional data in one block increments increment;
parsing the one block increment of the formatted additional data into words of the audio data; and
inserting bits of the formatted additional data into words of the audio data, wherein each of the inserted bits replaces a least significant bit (LSB) of each word of the audio data and replacing the LSB of each word changes processing of the uncompressed audio file from 16 bits per channel to 15 bits per channel, and the inserted bits of the formatted additional data are to be re-assembled in a form of the additional data before being being formatted for encoding; and
writing the audio data with inserted additional data to the CD in track-at-once mode.

8. The method for encoding additional data into the uncompressed audio file as recited in claim 7, further comprising:
the formatting including inserting header information between groups of bytes of the additional data.

9. The method for encoding additional data into an uncompressed audio file as recited in claim 7, further comprising:
reading the uncompressed audio file having the formatted additional data encoded therein, to allow reading least significant bits from the words of audio data into a temporary buffer and assimilating the least significant bits into a data file during decoding.

10. The method for encoding additional data into an uncompressed audio file as recited in claim 7, wherein the uncompressed audio file is in 44100 KHz 16-bit stereo format.

11. Computer readable media having program instructions for encoding additional data into uncompressed audio data to be recorded to a CD in track-at-once mode, the computer readable media comprising:
program instructions for formatting the additional data for encoding into the uncompressed audio data wherein the formatted user data having a header block and a plurality of data blocks, the header block and each of the plurality of data blocks having an ID string identifying related user data, the header block having total blocks used to identify the number of blocks of formatted user data, the ID string and the total blocks being used for re-assembling the formatted user data into a single user data file before being formatted for encoding;
program instructions for reading the uncompressed audio data;
program instructions for parsing of the uncompressed audio data into words of the uncompressed audio data, wherein each word contains 16 bits;
program instructions for replacing a least significant bit of each word of the uncompressed audio data with one bit of the formatted additional data to encode the uncompressed audio data, wherein replacing the LSB of each word changes processing of the uncompressed audio file from 16 bits per channel to 15 bits per channel, and wherein bits of the formatted additional data in the encoded uncompressed audio data are to be re-assembled in a form of the additional data before being formatted to be encoded into the uncompressed audio data; and
program instructions for writing the encoded uncompressed audio data to the CD in track-at-once mode.

12. The computer readable media of claim 11, wherein program instructions for preparing the additional data further comprising:
program instructions for determining a number of bytes required for encoding the additional data;
program instructions for creating a buffer for the number of bytes required for encoding the additional data;
program instructions for writing header information into the buffer; and
program instructions for writing bytes of the additional data into the buffer,
wherein the writing of bytes of the additional data into the buffer is in blocks of formatted additional data, the blocks of the formatted additional data including the header block and at least one subsequent block of one of the plurality of data blocks, the at least one subsequent block including header information and at least part of the additional data.

13. The computer readable media of claim 11, wherein the uncompressed audio data are in 44100 KHz, 16-bit stereo uncompressed audio format.

* * * * *